July 12, 1927.
E. CROUSE
1,635,260
LIQUID DISPENSING DEVICE
Filed Aug. 16, 1926
2 Sheets-Sheet 1
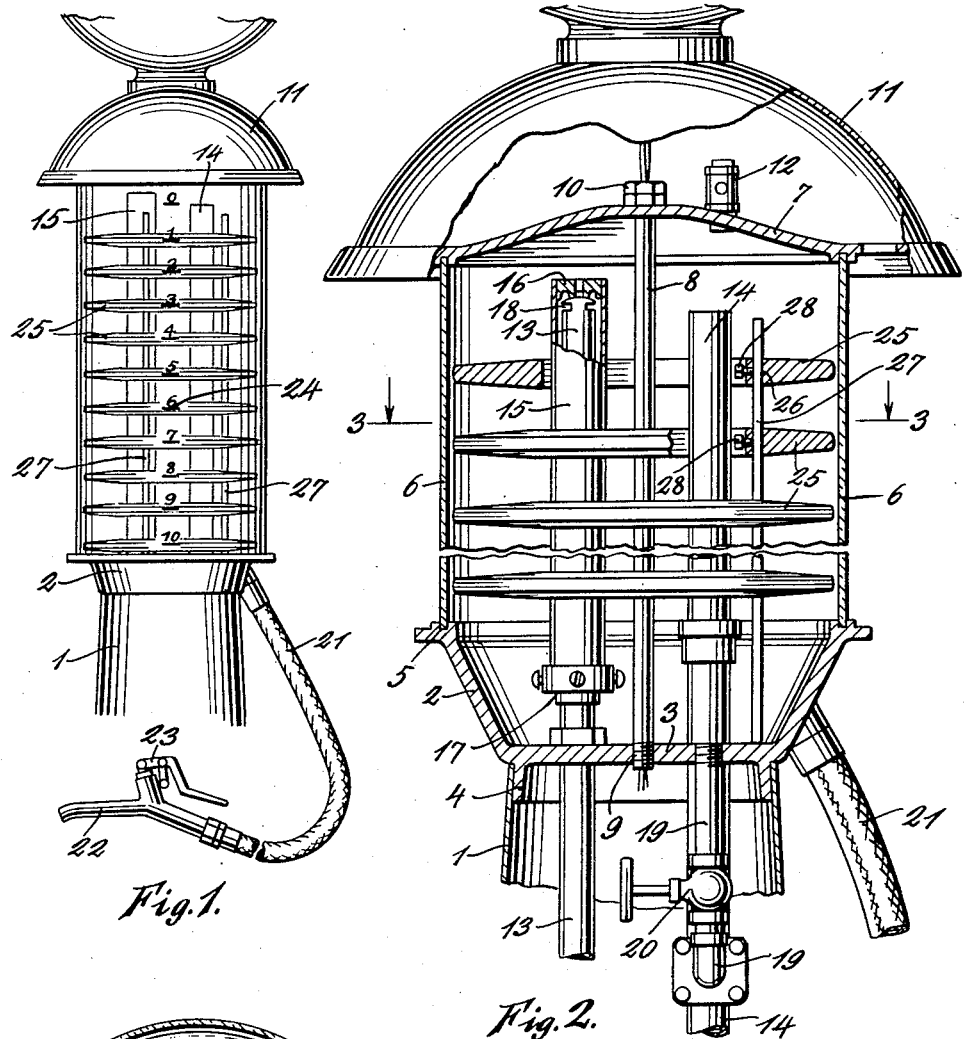
Fig. 1.
Fig. 2.
Fig. 4.
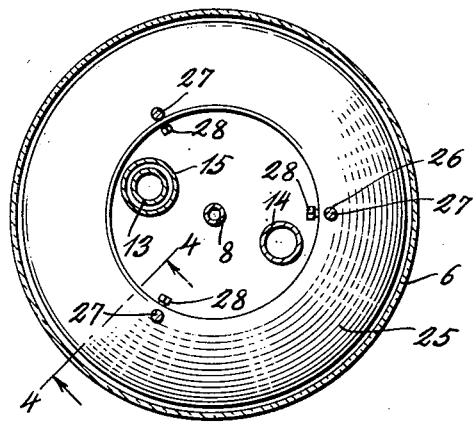
Fig. 3.
Inventor
Emory Crouse.
By A. J. O'Brien
Attorney July 12, 1927.

E. CROUSE

LIQUID DISPENSING DEVICE

Filed Aug. 16, 1926   2 Sheets-Sheet 2

1,635,260

Inventor

Emory Crouse.

By A. O'Brien

Attorney

Patented July 12, 1927.

1,635,260

UNITED STATES PATENT OFFICE.

EMORY CROUSE, OF WICHITA, KANSAS.

LIQUID-DISPENSING DEVICE.

Application filed August 16, 1926. Serial No. 129,341.

This invention relates to improvements in liquid dispensing devices of the type employing a calibrated transparent measuring bowl.

It is the object of this invention to provide a liquid dispensing device of the above type with means whereby the error which is due to the inability of the operator to close the drain valve at the instant when the liquid level in the measuring bowl is at the desired calibration mark, can be greatly reduced.

In dispensing devices of the type to which this invention relates, the measuring bowl comprises a glass cylinder having an inside diameter of twelve inches and is usually of such length that it will hold ten gallons. This glass cylinder is calibrated in gallons and fractions of a gallon. The calibrations may be formed by marks painted or etched in the cylinder surface or by a scale placed within the cylinder. The measuring bowls are usually provided with an overflow pipe whose upper end is located near the upper end of the cylinder, a supply pipe by means of which liquid is transferred from the supply tank to the measuring bowl and a drain pipe by means of which the contents of the bowl is transferred to a container. The drain pipe is provided with a quick acting valve. The operator in dispensing the liquid, usually gasoline, opens the valve in the drain pipe and permits the liquid to flow until the level in the bowl comes to the calibration mark that indicates the quantity which is to be dispensed. The valve must be closed when the liquid level is at the level of the proper calibration. This is not always possible and since the area of a twelve inch circle is 113.1 square inches, an error of one-tenth of an inch in the level of the liquid will make an error of 11.31 cubic inches in the quantity. As it is very difficult to read the liquid level as close as one-tenth of an inch from the position where the attendant stands, the error is usually more than ten cubic inches.

It is evident that if a cylinder of smaller diameter, for example nine and three-quarters inches (9¾), is employed the level will vary more for a given volume and that therefore the error will be less than with a twelve inch cylinder or bowl. The objection to using a measuring bowl of small diameter is that its length becomes excessive which is highly objectionable.

It is evident that if liquid is dispensed in gallon lots, the calibration marks, to which attention needs to be directed, are those that indicate the full gallons. If some means is provided for reducting the capacity of the bowl, per unit length, in the plane of the gallon graduations and a short distance above and below the same, then the same results may be obtained as with a cylinder of smaller diameter.

My invention, briefly described, consists in providing an ordinary transparent measuring bowl of large diameter with filler plates or disks which are spaced apart along the axis of the cylinder so that the volume of liquid between corresponding points on adjacent filler plates will be equal to the unit of measure employed. The area of the filler plates or disks in the plane of the unit calibration may be such as to reduce the effective area of the cylinder or bowl to that of a cylinder of any desired smaller diameter. When these disks are in place and properly spaced, the liquid level will fall at a faster rate at the unit calibrations than at intermediate points and this will reduce the error due to the operator's inability to close the discharge valve at the proper instant.

My invention which has been briefly described above will now be described in detail, and reference for this purpose will be had to the accompanying drawing in which the preferred embodiment thereof has been shown and in which:

Fig. 1 is a side elevation of the upper portion of a dispensing device showing the measuring bowl and dispensing hose;

Fig. 2 is a diametrical vertical section through the measuring bowl and shows the filler plates or disks, partly in elevation and partly in section;

Fig. 3 is a section taken on line 3—3, Fig. 2;

Fig. 4 is a section taken on line 4—4, Fig. 3;

Figure 5:
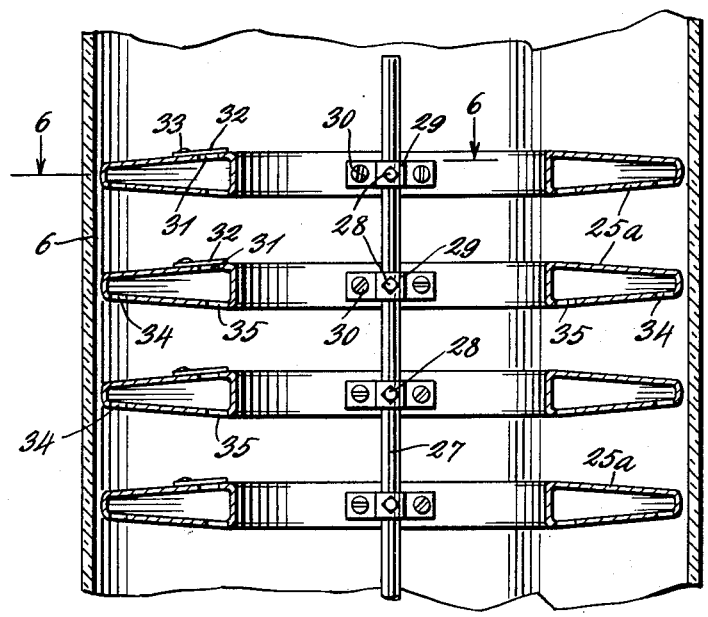
Fig. 5 is a diametrical section taken through the measuring bowl and filler disks and shows a modified form of disk.

Numeral 1 designates a supporting housing within which are located various pipes and valves for controlling the operation, but which have nothing to do with this invention and have therefore not been shown. Supported by the upper end of the housing is a base member having an inclined side wall 2 and a flat bottom 3. A flange 4 extends downwardly from the lower surface of the bottom 3 and this is adapted to extend into the interior of the housing 1 in the manner shown. The upper edge of wall 2 is provided with a groove 5 for the reception of the lower end of the transparent measuring cylinder 6 which has a liquid tight fit with the sides of the groove 5 and which with the base forms the measuring bowl. A cap 7 is secured to the upper end of the cylinder 6 and is held in place by means of a clamping member consisting of a pipe 8 whose lower end is threadedly connected with the bottom 3 at 9 and whose upper end is provided with nuts 10. An ornamental cap 11 has been shown as superimposed on the end closure 7. The closure 7 is perforated for the reception of a vent plug 12. Extending through the bottom 3 and into the bowl are two pipes 13 and 14 which are respectively the supply or fill pipe and the overflow pipe. The fill pipe is enclosed in a tubular housing 15 whose upper end has a vental closure 16 and whose lower end terminates at 17 near the bottom of the bowl. The top of the overflow pipe is slightly lower than the lower wall of the openings 18. A drain pipe 19 connects the interior of the bowl with the overflow pipe 14 and is controlled by a valve 20. A dispensing hose 21 has one end secured to the wall 2 and is in communication with the interior of the bowl and has the other end provided with a nozzle 22 which forms the bib of the quick acting self-closing valve 23. Gasoline is transferred from a storage tank by means of compressed air or by a pump and enters the measuring bowl through pipe 13. When the level of the liquid comes above the upper end of the overflow pipe 14, the supply is stopped and the surplus flows out through the pipe 14 whose upper end is on such a level that the measuring bowl will contain a given quantity of liquid, for example ten gallons. When the gasoline is being dispensed, valve 23 is opened and the gasoline permitted to flow into the gasoline tank on the automobile. The amount that is dispensed is determined by watching the level of the liquid and comparing it with the calibration marks 24, all in a manner old and well known.

I have previously explained that it is desirable to have the glass cylinders 6 of a diameter of about 12 inches as this makes it possible to make the bowl of reasonable length. I have also explained how an error of one-tenth of an inch in the reading will make an error of about 11.31 cubic inches in the volume dispensed. If accuracy in dispensing were the only consideration, this could readily be attained by using a cylinder of small diameter. This, however, is not desirable for many reasons, among which may be mentioned that such a cylinder would be excessively long.

It is evident that since the reading of the liquid level is almost invariably done at the graduations, indicating full gallons, that if some convenient means can be provided for decreasing the volume of liquid per unit length of cylinder at and to both sides of the gallon calibration marks, the rate at which the liquid level will fall at the unit calibration marks will increase when the liquid is drained at a constant rate and that the probable error will thereby be reduced. Thus, for example, if solid annular filler plates or disks like those indicated by numeral 25 are placed within the measuring bowl and supported in spaced relation, with their planes of symmetry at right angles to the axis of the cylinder and passing through the unit calibration marks, then the effective area of the cylinder in planes intersecting these rings will be diminished by the corresponding area of the ring. It is therefore evident that the liquid level will drop a greater distance per unit volume at those points where the level intersects the fillers and thus an increased accuracy of reading will be obtained. The fillers, which have been shown as rings, may have a cross section like that shown in Fig. 2 where they are shown as tapering slightly towards the outer edge and may be solid or cored like that indicated in Fig. 4. Each ring or filler plate is preferably provided with three holes 26 for the reception of the supporting rods 27 to which they are secured by means of set screws 28. The fillers 25 are so adjusted that the volume of liquid from the plane of the upper end of the overflow pipe 14 to the plane of symmetry of the uppermost filler will be one gallon or one unit of liquid measure and the remaining fillers are so spaced that the liquid contents between the planes of symmetry of adjacent disks will be one gallon or unit. When the liquid is withdrawn at a constant rate, the level will fall at a constant rate until it begins to intersect the filler ring when it will fall faster and the rate of falling will be the maximum at the level of the plane of symmetry. By properly proportioning the area of the fillers, the rate of fall that corresponds to any diameter of cylinder, smaller than the one used, may be obtained.

When the rings or filler disks are solid, they displace a considerable amount of liquid and therefore the cylinder 6 must be made longer for a given capacity. This is objectionable to some extent and I have therefore provided a modified construction which will give substantially the same result and requires a less increase in the length of the cylinder and this will now be described.

Figure 6:
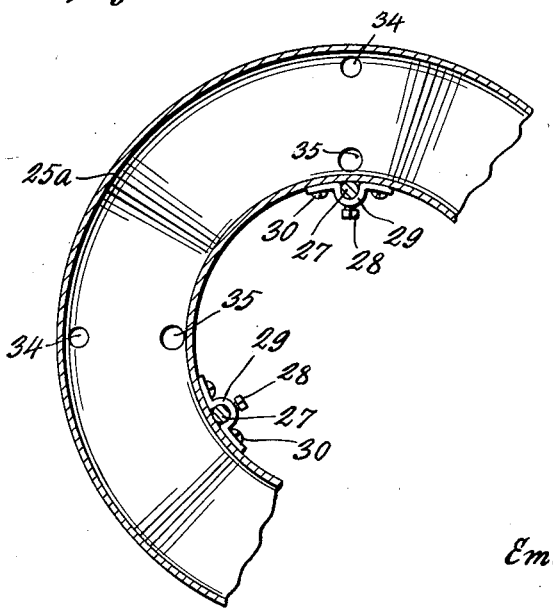
Fig. 6 is a section taken on line 6—6, Fig. 5.

In Figs. 5 and 6 the fillers 25ª have the same size and shape as those already described, but are hollow with walls as thin as practicable. The supporting rods 27 preferably pass through openings in the straps 29 which are secured to the rings by means of screws 30. The upper wall of the fillers is provided with an opening 31 that is closed by a flap 32 which is fastened at 33. This flap may be of leather or any other suitable material and serves as a check valve which permits liquid to flow outwardly but prevents liquid or air from flowing into the interior of the ring. The lower side of the ring is provided with two sets of openings 34 and 35. The openings 35 are nearer the center and consequently lower than the openings 34. When filler disks or rings like those shown in Figs. 5 and 6 are used, the operation is as follows:

When the gasoline is transferred to the measuring bowl, the level rises and as it reaches the holes 34 and 35, it enters the interior of the ring, the air escaping through the hole 31. It will thus be apparent that the volume of liquid displaced is equal to the volume of the metal in the fillers and as these can be made of thin material, they reduce the capacity of the bowl only slightly. When the gasoline is dispensed, it will not flow outwardly from the interior of the fillers until after the level has reached a point below the openings 34, because until this point is reached, there is no way for the air to enter as the flap 32 prevents it from entering through the opening 31. These filler rings therefore operate exactly as if they were solid as far as the function of increasing the rate of movement of the liquid level is concerned. When the level of the liquid comes below openings 34, air will enter and the liquid within the filler will flow out through openings 35. If the drain valve is closed, when the liquid level is at the center of the ring, or at its horizontal plane of symmetry, the liquid within will be added to the next gallon withdrawn.

It is evident that the fillers shown in Figs. 5 and 6 take up very little of the capacity of the bowl and serve the same function as the solid rings.

From the above it will be apparent that I have provided an improved liquid dispensing device in which it is possible to obtain a more exact reading and thereby reduce the probable error to any extent desired.

Having now described my invention what is claimed as new is:

1. In a liquid dispensing device having a transparent measuring bowl, and calibrating means associated with the bowl for determining the quantity of liquid contained in the bowl at any given level of the liquid surface, the combination of means for causing the liquid level in the bowl to descend at a greater rate at the calibrations indicating the unit of measure than at other points, said means consisting of a plurality of filler means fixedly secured within the bowl at each unit calibration, said means extending transversely of the measuring bowl at the levels of the calibrations and being thicker near the center than at the edges and having planes of symmetry coinciding with the unit level calibrations, said means being hollow and provided with two openings in the lower surface and one opening in the upper surface, the openings in the lower surface being on different levels at different distances from the center, the hole farther from the center being the higher and an outwardly opening check valve associated with the hole in the upper surface.

2. In a liquid dispensing device having a transparent measuring bowl provided with calibration marks, of hollow filler disks spaced along the axis of the cylinder, said disks having means for permitting the liquid to enter the interior from below as it is transferred to the bowl, and for preventing the liquid from flowing out of the disks until the liquid level has reached a predetermined low point.

3. In a liquid dispensing device having a transparent measuring bowl provided with calibration marks, the combination of hollow filler disks spaced along the axis of the bowl to coincide with said marks, each of said disks having an opening in its upper surface, an outwardly opening check valve associated with said last named opening and two openings in its under surface, one of said last named openings being at a higher level than the other.

4. In a liquid dispensing pump of the class described comprising a glass cylinder for the liquid, spaced hollow indicating disks in said cylinder and adapted to receive said liquid, a check valve in the upper surface of each of said disks to allow the escape of air therefrom while filling, and openings in the lower surface thereof, one for admitting air thereto and the other to drain liquid therefrom, substantially as set forth.

5. In a liquid dispensing pump of the class described comprising a glass cylinder for the liquid, spaced hollow indicating disks in said cylinder and adapted to receive said liquid, a check valve in the upper surface of each of said disks to allow the escape of air therefrom while filling, and openings in the lower surface thereof at different elevations, substantially as set forth.

6. In a liquid dispensing device having a measuring bowl, the combination of a plurality of filler means located within the bowl and fixedly spaced along the axis thereof for the purpose of reducing the capacity of the bowl per unit length at spaced points.

7. In a liquid dispensing device having a measuring bowl, the combination of a plurality of filler means located within the bowl, said filler means being fixedly spaced such a distance apart that the volume of the bowl between corresponding points on the adjacent filler means will be equal to a predetermined measure.

8. In a liquid dispensing device having a measuring bowl the combination of means for periodically increasing the rate at which the level in the measuring bowl falls while the liquid is withdrawn at a constant rate, said means comprising a plurality of filler means fixedly secured in spaced relation along the axis of the bowl.

9. In a liquid dispensing device having a measuring bowl, the combination of means for periodically increasing the rate at which the level in the measuring bowl falls while the liquid is withdrawn at a constant rate, said means comprising a plurality of filler means fixedly secured in spaced relation along the axis of the bowl, each filler means having a cross section similar in shape to the cross section of the bowl but somewhat smaller than the interior of the bowl so as to be spaced from the latter.

10. In a liquid dispensing device having a transparent measuring bowl and calibrating means associated with the bowl for determining the quantity of liquid contained in the bowl at any given level of the liquid surface, the combination of a plurality of transverse filler means fixedly secured in spaced relation within the measuring bowl, said filler means being symmetrically arranged with respect to the interior surface of the bowl and having their peripheral surfaces spaced from the inner surface of the bowl so as to provide an annular layer of liquid between the outer surface of the filler means and the inner surface of the bowl.

11. In a liquid dispensing device having a transparent measuring bowl and calibrating means associated with the bowl for determining the quantity of liquid contained in the bowl at any given level of the liquid surface, the combination of a means for causing the liquid level to descend at a greater rate at the calibrations indicating the unit of measure than at other points, said means consisting of a plurality of filler means fixedly secured within the bowl at each unit calibration each of said filler means displacing a volume of liquid whereby the volume of liquid content per unit length of the bowl is diminished at the level of the unit calibration so that the liquid level will descend faster per unit volume of liquid withdrawn at the level of unit calibration than at intermediate points.

12. In a liquid dispensing device having an elongated measuring bowl of transparent material and calibrating means associated with the bowl for indicating the contents in liquid measure at the various levels, the combination of a plurality of transversely arranged filler means, one filler means being located at each calibration mark which designates a unit volume, said filler means having openings for the reception of the supply and overflow pipes and means for fixedly securing the filler means in a predetermined relation with respect to each other and with respect to the measuring bowl.

In testimony whereof I affix my signature.

EMORY CROUSE.